United States Patent
Shah et al.

(10) Patent No.: US 9,661,090 B2
(45) Date of Patent: *May 23, 2017

(54) CONNECTION INVITATION ORDERING

(71) Applicant: LinkedIn Corporation, Mountain View, CA (US)

(72) Inventors: Samir M. Shah, San Francisco, CA (US); Mitul Tiwari, Mountain View, CA (US); Roshan Rajesh Sumbaly, Santa Clara, CA (US); Curtis Wang, Santa Clara, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,172

(22) Filed: Aug. 17, 2015

(65) Prior Publication Data

US 2015/0356453 A1    Dec. 10, 2015

Related U.S. Application Data

(63) Continuation of application No. 14/309,379, filed on Jun. 19, 2014, now Pat. No. 9,137,323, which is a
(Continued)

(51) Int. Cl.
*G06F 15/16* (2006.01)
*H04L 29/08* (2006.01)
(Continued)

(52) U.S. Cl.
CPC ........ *H04L 67/22* (2013.01); *G06F 17/30861* (2013.01); *G06N 7/005* (2013.01);
(Continued)

(58) Field of Classification Search
USPC ................ 709/204, 206, 248; 707/748; 1/1; 705/14.66; 155/450
See application file for complete search history.

(56) References Cited

U.S. PATENT DOCUMENTS 6,748,451 B2 * 6/2004 Woods ................. G04G 15/006
                                               709/248
7,539,697 B1    5/2009 Akella
(Continued)

OTHER PUBLICATIONS

"U.S. Appl. No. 14/031,662, Final Office Action mailed May 20, 2014", 6 pgs.
(Continued)

*Primary Examiner* — Quang N Nguyen
(74) *Attorney, Agent, or Firm* — Schwegman Lundberg & Woessner, P.A.

(57) ABSTRACT

Disclosed in some examples are methods, systems, and machine-readable mediums which provide a relevance engine for determining a relevance of an individual (either a non-member or another member) to another individual (either a non-member or another member). This relevance engine may use signals in the form of data that the social networking service may learn about the individuals to determine how relevant the individuals are to each other. Example applications may include ordering of connection invitations in a social networking service.

20 Claims, 6 Drawing Sheets

Related U.S. Application Data continuation of application No. 14/067,681, filed on Oct. 30, 2013, now Pat. No. 8,825,785.

(60) Provisional application No. 61/806,362, filed on Mar. 28, 2013.

(51) Int. Cl.
| | |
|---|---|
| *H04L 29/06* | (2006.01) |
| *G06N 7/00* | (2006.01) |
| *G06F 17/30* | (2006.01) |
| *G06Q 50/00* | (2012.01) |
| *G06Q 10/10* | (2012.01) |

(52) U.S. Cl.
CPC ........... *G06Q 10/107* (2013.01); *G06Q 50/01* (2013.01); *H04L 65/403* (2013.01); *H04L 67/306* (2013.01)

(56) References Cited

U.S. PATENT DOCUMENTS

| | | | |
|---|---|---|---|
| 8,825,785 | B1 | 9/2014 | Shah et al. |
| 8,838,581 | B2 | 9/2014 | Tseng |
| 8,909,559 | B1 | 12/2014 | Shah et al. |
| 9,137,323 | B2 | 9/2015 | Shah et al. |
| 9,177,012 | B2 * | 11/2015 | Linkola ............... H04M 7/0084 |
| 9,269,081 | B1 * | 2/2016 | Panzer ................. G06Q 10/107 |
| 2002/0019234 | A1 * | 2/2002 | Wright ................... H04M 3/36 455/450 |
| 2009/0271370 | A1 | 10/2009 | Jagadish et al. |
| 2009/0319288 | A1 | 12/2009 | Slaney et al. |
| 2011/0238755 | A1 | 9/2011 | Khan et al. |
| 2011/0270921 | A1 | 11/2011 | Jones et al. |
| 2011/0270923 | A1 | 11/2011 | Jones et al. |
| 2011/0271192 | A1 | 11/2011 | Jones et al. |
| 2012/0197993 | A1 | 8/2012 | Skomoroch et al. |
| 2012/0278076 | A1 | 11/2012 | Lloyd et al. |
| 2013/0024516 | A1 | 1/2013 | Blinder |
| 2013/0031190 | A1 | 1/2013 | Chan et al. |
| 2013/0080521 | A1 | 3/2013 | Souza et al. |
| 2013/0144682 | A1 | 6/2013 | Dhara et al. |
| 2013/0185355 | A1 * | 7/2013 | Tseng .................... H04L 65/403 709/204 |
| 2013/0232197 | A1 * | 9/2013 | Shin ........................ H04L 51/32 709/204 |
| 2013/0254309 | A1 | 9/2013 | Jackson et al. |
| 2013/0287296 | A1 | 10/2013 | Li et al. |
| 2013/0304731 | A1 | 11/2013 | Zheng et al. |
| 2014/0052539 | A1 * | 2/2014 | Lauback ............ G06Q 30/0255 705/14.66 |
| 2014/0067937 | A1 * | 3/2014 | Bosworth ............. H04L 65/403 709/204 |
| 2014/0089320 | A1 * | 3/2014 | Baldwin ........... G06F 17/30867 707/748 |
| 2014/0172989 | A1 * | 6/2014 | Rubinstein .............. H04L 51/12 709/206 |
| 2014/0214946 | A1 * | 7/2014 | van de Bruggen ... H04L 67/306 709/204 |
| 2014/0244742 | A1 * | 8/2014 | Yu ......................... H04L 65/403 709/204 |
| 2014/0304202 | A1 | 10/2014 | Shah et al. |
| 2015/0046539 | A1 | 2/2015 | Shah et al. |

OTHER PUBLICATIONS

"U.S. Appl. No. 14/031,662, Non Final Office Action mailed Dec. 5, 2013", 8 pgs.

"U.S. Appl. No. 14/031,662, Notice of Allowance mailed Jul. 30, 2014", 7 pgs.

"U.S. Appl. No. 14/031,662, PTO Response to Rule 312 Communication mailed Sep. 23, 2014", 2 pgs.

"U.S. Appl. No. 14/031,662, Response filed Mar. 5, 2014 to Non Final Office Action mailed Dec. 5, 2013", 13 pgs.

"U.S. Appl. No. 14/031,662, Response filed Jul. 21, 2014 to Final Office Action mailed May 20, 2014", 9 pgs.

"U.S. Appl. No. 14/067,681, 312 Amendment filed Jul. 15, 2014", 9 pgs.

"U.S. Appl. No. 14/067,681, Non Final Office Action mailed Jan. 2, 2014", 12 pgs.

"U.S. Appl. No. 14/067,681, Notice of Allowance mailed Apr. 15, 2014", 10 pgs.

"U.S. Appl. No. 14/067,681, PTO Response to Rule 312 Communication mailed Jul. 22, 2014", 2 pgs.

"U.S. Appl. No. 14/067,681, Response filed Apr. 2, 2014 to Non Final Office Action mailed Jan. 2, 2014", 17 pgs.

"U.S. Appl. No. 14/309,379, Non Final Office Action mailed Jan. 26, 2015", 7 pgs.

"U.S. Appl. No. 14/309,379, Notice of Allowance mailed May 11, 2015", 8 pgs.

"U.S. Appl. No. 14/309,379, Preliminary Amendment filed Sep. 17, 2014", 9 pgs.

"U.S. Appl. No. 14/309,379, Response filed Apr. 27, 2015 to Non Final Office Action mailed Jan. 26, 2015", 11 pgs.

"U.S. Appl. No. 14/525,824, Preliminary Amendment filed Feb. 2, 2015", 7 pgs.

\* cited by examiner ps://patents.google.com/patent/US9661090B2

CONNECTION INVITATION ORDERING

CLAIM OF PRIORITY

This patent application is a Continuation of U.S. patent application Ser. No. 14/309,379 which issued on Sep. 15, 2015 as U.S. Pat. No. 9,137,323, which is a Continuation of U.S. patent application Ser. No. 14/067,681, filed Oct. 30, 2013, which. issued on Sep. 2, 2014 as U.S. Pat. No. 8,825,785, which claims the benefit of priority, under 35 U.S.C. Section 119 to U.S. Provisional Patent Application Ser. No. 61/806,362 filed on Mar. 28, 2013, which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, Inc., All Rights Reserved.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
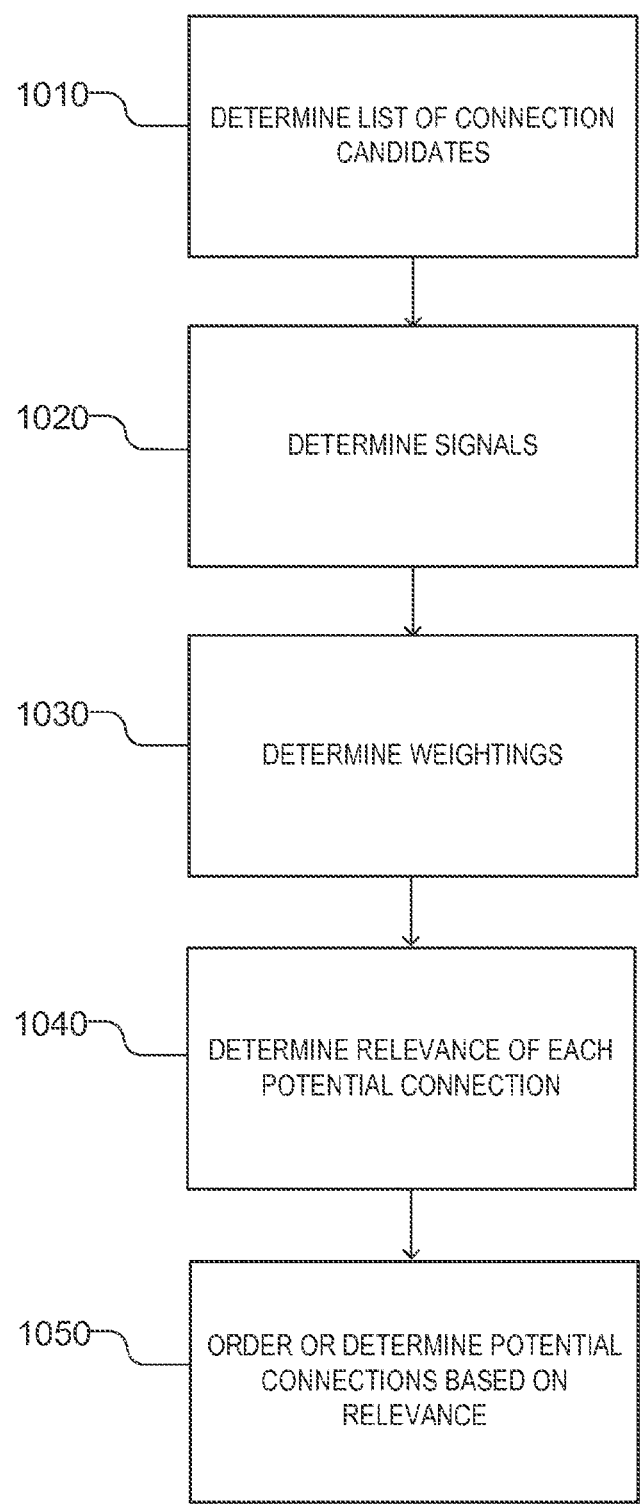
FIG. 1 shows a flowchart of a method for determining connection relevance of a first individual to a second individual according to some examples of the present disclosure.

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service.

A social networking service is an online service, platform or site that allows members of the service to build or reflect social networks or social relations among the members. Typically, members construct profiles, which may include personal information such as the member's name, contact information, employment information, photographs, personal messages, status information, links to web-related content, blogs, and so on. In order to build or reflect these social networks or social relations among members, the social networking service allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of business networking purposes and a social networking service may likewise be used for business networking purposes as well as or in place of social networking purposes. A connection is generally formed using an invitation process in which one member "invites" a second member to form a link. The second member then has the option of accepting or declining the invitation.

In general, a connection or link represents or is otherwise associated with an information access privilege, such that a first person who has established a connection with a second person is, via the establishment of that connection, authorizing the second person to view or access certain non-publicly available portions of their profiles which may include communications they have authored (e.g., blog posts, messages, "wall" postings, or the like). Of course, depending on the particular implementation of the business/social networking service, the nature and type of the information that may be shared, as well as the granularity with which the access privileges may be defined to protect certain types of data may vary greatly.

Some social networking services may offer a subscription or following model instead of, or in addition to the connection model. A subscription or following model is where one member "follows" another member without the need for mutual agreement. Typically in this model, the follower is notified of public messages and other communications posted by the member that is followed. An example social networking service that follows this model is Twitter—a micro-blogging service that allows members to follow other members without explicit permission. Other, connection based social networking services also may allow following type relationships as well. For example, LinkedIn allows members to follow particular companies.

As social networking services have expanded, it has become more difficult for members to determine which other members or non-members are relevant enough to connect with. For example, some members are inundated with connection requests from dozens of people every day. It may take some time to determine which of these connection requests are from people who the member actually knows. In other examples, individuals who are relevant to a particular member may not be members of a particular social networking service as it may not occur to the member that the non-member is not a member of the social networking service and not connected with the member.

Disclosed in some examples are methods, systems, and machine-readable mediums which provide a relevance engine for determining a relevance of an individual (either a non-member or another member) to another individual (either a non-member or another member). This relevance engine may use signals in the form of data that the social networking service may learn about the individuals to determine how relevant the individuals are to each other.

In some examples, this relevance engine may be used to assist current members in determining relevant potential connections from a group of potential connection candidates. Connection candidates may be members or non-members of the social networking service. For example, the system may recommend to a first member one or more other members that the first member is not already connected with that the system has determined are likely to know each other. In other examples, the system may use various information gathered about social connections that members have to non-members to determine a list of non-members to recommend to other members for possible invitation to the social networking service.

In order to prevent the system from presenting a large list of recommendations, the system may filter and/or sort the recommendations by relevance to the member based upon information the social networking service knows or gathers about the member and the other individuals (either members or non-members). In this way, the social networking service may deliver the most relevant possible recommended connections.

In still other examples, the relevance engine may be used to sort connection invitations. In these examples, the connection candidates may be members who have sent an invitation to connect with the subject member. The system may use the relevance engine to indicate how relevant these members are and filter and/or sort the connection invitations to allow the member to see the most relevant connection invitations first to keep them from having to sort through a potentially long list of invitations to find relevant connections.

FIG. 1 shows one example relevance method according to some examples of the present disclosure. At 1010 a list of connection candidates may be determined. For example, this may be the list of members who have sent invitations to connect with a particular subject member. In other examples, this may be the list of non-members that the system has scraped from various sources that may be relevant to the subject member. In yet other examples, the list may be members that have not already connected to the subject member.

At operation 1020, the various signals that are to be used to determine relevance may be determined. For example, the social networking service may fetch the data (e.g., from member profiles) to determine the presence of the signals that are to be used in making the relevance recommendation. Thus if IP address is utilized as a signal, then the system will fetch the IP addresses used by the member or non-member.

The particular signals that are utilized may be predetermined. In some examples, the signals may be the same regardless of the context with which the relevance engine is utilized. Thus the same signals may be utilized for determining relevance for connection invitation ordering contexts as is used in contexts related to determining relevant non-members for invitation suggestions. In other examples, the relevance engine may use one set of signals (i.e. factors) for one particular context of the relevance engine and another, wholly or partially different set of signals for a different context. For example, in the case of recommending non-members to members, the signals used may include things like: frequency of email contact between the member and the non-member, how many different modes of communication the member has to contact this individual (e.g., if the member has both an email and a phone number for the individual in their contacts it is more likely they know the person that if they just have their email), whether the individual is in the member's contact book, or the like. In still other examples, a signal may include the presence of a non-member in the address book of a connection of a member. For example, if members Justin, Nate, and Andre are all connected, and Jim Bob is in Nate and Andre's address book but not Justin's, the system might recommend Jim Bob to Justin based on Jim Bob being in the address book of two of Justin's connections. As already noted, for other uses, the above mentioned signals may or may not be relevant. Additionally, signals that do overlap in use case may have a different importance assigned in different use cases. Some other signals, that may be relevant for example in connection invitation ordering, may include the frequency with which the invitee member views the inviting member's profile page, common connections (e.g., the number of other members that each is connected in common with), or the like.

At operation 1030, the various weights applied to each signal may be determined and applied. Each different context of the relevance engine may utilize the same set of weightings or a different set of weightings of the various signals. For example, in the case of recommended non-members the number of times the member has emailed the non-member may be weighted more than the number of times the non-member has contacted the member, whereas in the case of connection request relevance, these signals may be weighted differently. In one alternative embodiment, the operations of 1020 and 1030 may be combined such that the entire list of signals may be utilized regardless of the context, however, those signals that do not apply to a particular context may be weighted with a zero weight for that context (effectively not using the particular signal).

The weights may be determined manually, or as a result of a machine learning optimization based upon past data and various machine learning algorithms. For example, the relevance engine may utilize a neural network where the weights are weights applied to various input signals in various stages of the neural network to produce the relevance determination. These weights may be learned based upon a set of training data. In other examples the weights may correspond to one or more posterior probabilities for the various signals which may be utilized in a Bayesian classifier.

At operation 1040, for each potential connection in the list, the relevance scores may be determined. In some examples, the relevance scores may be calculated using a Bayesian classifier (e.g., a naïve Bayesian classifier) which may determine a probability that the potential connection is relevant based upon the signals and the signal weights (in the form of posterior probabilities). In yet other examples, the relevance scores may be computed based upon a weighted sum of subscores generated for each signal or category of signals. The subscores may be determined directly from the various signals or using one or more formulas. For example, the system may determine that the number of profile views of the inviting member's profile by the invitee member may be used to calculate the final relevance score. For example, the number of views * the weighting factor may be summed with other weighted factors to determine a relevance score. In other examples, formulas may be applied to produce the sub-score that may be used. For example, the subscore may be a normalized number of profile views that factors in how long ago the profile view occurred (e.g., more recent views may be more indicative of knowledge). For signals which are not able to be directly weighted and aggregated (e.g., they do not produce a number) the system may use a formula to convert it into a subscore. In some other examples the relevance scores may be calculated based upon a neural network which may calculate the probability based upon one or more operation layers, and in some examples, may utilize the subscores for particular signals. At operation 1050, once all the relevance scores are calculated the potential connections list may be sorted to show the most relevant potential connections first.

Example Signals

As used in the specification, the term: "signals," when referring to the relevance engine may refer to one or more indicators of relevance that may signal that a first person is likely to know a second person. Signals may take the form of any data collected about an individual and may include data representing properties of or related to the individual (name, address, employment history) or data representing activities undertaken by or related to the individual (communications by the individual, or the like). The following presents a non-limiting example of signals which may be utilized to determine relevance. In some examples, relevance may be defined as a probability above a particular threshold that one individual would know another individual.

A first signal that may be used may be the distance between locations associated with IP addresses used by the individuals being compared—the closer the distances, the more likely they are to actually know each other. For members, the IP address, or set of IP addresses that the members use to login to the social networking service may be translated into a geolocation using a database which may associate IP addresses with geolocations. For non-members, certain data may be collected which may allow the system to determine the non-member's IP address. For example, an email address associated with the non-member may resolve to a particular domain which has an IP address which may be translated into a geolocation. The subscores used in the relevance calculation (for the example in which the subscores are weighted and summed) may be calculated by assigning points based upon distance between the locations. For example, a fairly close distance may receive more points than a larger distance.

Similar jobs, job functions, and industries may indicate that the member and the connection candidate know each other. Job titles, job functions, and industries may be determined from member profiles of the social networking service, or for non-members, from scraping activities by the social networking service. For example, for non-members, if the social networking service knows a work email address of a non-member, the social networking service may ascertain a domain name of the employer of the connection candidate. The social networking service may use the domain name to locate a web site of the employer and may then scrape the employer's website to gain information about the employer and about the non-member, such as job title, industry, or job function. In examples in which the relevance score is calculated based upon subscores, a similarity subscore may be calculated through a number of similarity algorithms such as Latent Semantic Analysis (LSA). The total of the assigned scores for this signal may be summed to form the subscore for this signal.

Employment at similar employers may also be used as a signal for relevance. For example if the member and the connection candidate have the same or similar employers (either currently or historical) it may be suggestive of a relevance between them. For example, an employee of Facebook and LinkedIn are more likely to know each other than an employee of LinkedIn and Wal-Mart. Additionally, the system may factor in temporal (if any) overlap with respect to employment. Thus a Facebook and a LinkedIn employee who were both employed at their respective companies at the same time would be more likely to know each other than two employees who were employed at their respective companies at different times. Similar to the co-view or co-interaction concepts which will be discussed later, if an individual A has a similar employment history as an individual B and B has a similar employment history with C, but A's and C's employment histories are different, the probability of A and C knowing each other may increase through their respective commonalities with B. This concept may also be applied to schools or other institutions that individuals may be associated with. In examples in which the relevance score is calculated based upon subscores, a subscore for this signal may be calculated based upon a similarity score between employers using LSA analysis or some other statistical algorithm. To account for the time component, the subscore may be adjusted based upon how much temporal overlap their employment histories had.

Requesting information about an individual from the social networking service may also be a signal about the relationship between the requestor and the person whose information is being requested. One example of this is a profile view. For example, if A views B's profile then A is more likely to know B. Another signal may include co-views which are common profile views. For example, a co-view in some examples is where member A and member B both view member C's profile. This may suggest that A and B know each other through common member C. This signal may be registered both on the social networking service website, and potentially through one or more plugins installed on the user's home machine (e.g., a mail program plugin that may grab information about members and display it in an email application for a member's convenience). In examples in which the relevance score is calculated based upon subscores (e.g., a weighted aggregation of subscores), a profile view subscore may be calculated by assigning a number of points for each profile view. For example, if individual B is being evaluated to determine if they are relevant to individual A, anytime A views B's profile, points may be assigned to this subscore. In other examples, if B views A's profile, points may also be assigned (but in some examples, fewer points may be assigned for this case). The total of the assigned scores for this signal may be summed to form the subscore for this signal.

Emails or other communications may also be signals of relevance. For example if individual A sends individual B an email, posts on B's wall or on their member page, or otherwise communicates with B, A and B are more likely to know each other. The co-view concept discussed with respect to profile page views may also be broadened to include co-interaction signals—e.g., if A contacts or interacts with individual C and B contacts or interacts with C, then A and B may know each other. In examples in which the relevance score is calculated based upon subscores, a subscore for this signal may be calculated in some examples by assigning points for each instance of communication observed. Different types of communication may receive different point valuations (e.g., email may be worth more points than a wall posting). The total of the assigned scores for this signal may be summed to form the subscore for this signal.

Similar skills may also be used as a signal. In some examples, social networking services may allow members to indicate the types of skills they possess. Common skills may be a signal. For example, if member A and member B have one or more overlapping or similar skills identified in their profiles, it may suggest they have a higher likelihood of knowing each other. In examples in which the relevance score is calculated based upon subscores, a subscore may be calculated by applying an LSA analysis (or some other similarity algorithm) to each skill possessed by each of the compared individuals and summing the similarities calculated.

Skill endorsements and co-skills endorsement may be a relevance signal. In some examples, a social networking service may allow members to endorse each other as having a particular skill or being proficient in a particular skill. This endorsement may be suggestive of relevance. Additionally, co-skills endorsements may also be suggestive of relevance. For example, if A and B both endorse C for a particular skill, then it is more likely that A and B know each other based on their shared knowledge of C. In examples in which the relevance score is calculated based upon subscores, a subscore for this signal may be calculated by assigning a number of points for each endorsement or co-endorsement. The total of the assigned scores for this signal may be summed to form the subscore for this signal.

In evaluating relevance between a member and a connection candidate that is also a member of the social networking service, the number of connections that each individual has in common may be a signal. In some examples this may be normalized by the size of each member's social network. In examples in which the relevance score is calculated based upon subscores, a subscore may be calculated by assigning a number of points for each common connection and summing the total number of assigned points. This may be normalized by dividing by the number of connections in the individual's network. In some examples, this may also be a signal for non-member connection candidates if the system is able to determine connections on a different social networking service. For example, if connection candidate B's relevance to member A is being determined, and member A is connected to member C on the host social networking service, and member D on a second social networking service and connection candidate B is connected to member C and member D on the second social networking service, the common connections to C and D (viewed across multiple social networking services) may suggest (and be used to calculate) relevance.

In some examples, social networking services may provide groups of common interest that members can join and exchange information related to the subject matter of the group. Membership in common groups may be used a relevance signal. For example, two individuals who belong to the same group on the social networking service are more likely to know each other. In examples in which the relevance score is calculated based upon subscores, a common group subscore may be calculated by assigning a given amount of points to each common group and summing the amount of assigned points. In addition, if the connection candidate is a non-member, the social networking service may still learn about memberships in common groups through other data gathering activities, so this signal is not limited to just connection candidates that are members.

Age similarities may also be a relevance signal. Individuals of the same age are more likely to know each other than individuals of differing ages. Age subscores may be calculated based upon how close in age two individuals are. In examples in which the relevance score is calculated based upon subscores, an age subscore may be calculated by subtracting the difference in age from some base number (e.g., 100) which then represents the subscore.

A "browsemap" score may also be a relevance signal. For example, a social networking service may contain a widget (e.g., a browsemap) which may present recommended content and profiles to users. The number of times a particular individual visits a profile of the other individual, or visits any page containing information about that individual during a particular browse map session may be used as a signal for relevance. In examples in which the relevance score is calculated based upon subscores, a subscore for this factor may be calculated by assigning a particular number of points for each view and then summing the total number of assigned points.

Another signal may be connections or communications on another network service, such as another social networking service. For example, members may link or associate social networking service accounts such that one social networking service may view connections on the other social networking service. As another example a member may indicate a particular Twitter® account on their member profile. A following or followed relationship on Twitter® may indicate relevance. Twitter® is a micro blogging service run by Twitter® Inc., of San Francisco Calif. In examples in which the relevance score is calculated based upon subscores, a subscore for this signal may be calculated by assigning points for each connection on another social networking service platform and summing all the assigned points to form the subscore for this signal.

In some examples, social networking services may allow for members to recommend other members. This may be used as a relevance signal. For example, if individual A recommends individual B, then it is more likely that A and B know each other. Also, if A and B both recommend C for a particular position then it is more likely that A and B know each other based on their shared knowledge of C. In examples in which the relevance score is calculated based upon subscores, a subscore for this signal may be calculated by assigning a number of points for each recommendation or co-recommendation. The total of the assigned scores for this signal may be summed to form the subscore for this signal.

Email address similarities may also be a relevance signal. For example if the member and the connection candidate have similar email addresses (e.g., the same or similar domain names, spellings, and the like) then it is more likely they know each other. This probability may increase if the domain name is small and may decrease if the domain name is large. In examples in which the relevance score is calculated based upon subscores, a subscore for this signal may be calculated based upon LSA, or some other statistical similarity algorithm, or the like.

Similar IP addresses may be a relevance signal. If the member and the connection candidate have similar IP addresses (e.g., from the same subnet) this may increase the probability that the member and the connection candidate know each other. This probability may increase if the IP address is exclusive (e.g., the number of observed IP addresses that are similar is small), and may decrease if the IP address is not exclusive. In examples in which the relevance score is calculated based upon subscores, a subscore for this signal may be calculated based upon LSA, or some other statistical similarity algorithm, or the like.

One individual including the other in an address book may also be a relevance signal. For example if you are listed in someone else's address book, this may increase the probability that you know that person. If you list that person in your address book, that may increase the probability that you know that person. If you are both listed in each other's address book, the probability may be even greater. In examples in which the relevance score is calculated based upon subscores, a subscore for this signal may be calculated by assigning a number of points for each address book entry in which one of the individual appears in the other's address book. The total of the assigned scores for this signal may be summed to form the subscore for this signal. The address books used may be social networking service provided address book features, or may be address books provided by third party services that are accessible by the social networking service.

In other examples, explicit feedback may be signals to the system regarding relevance. For example, if the system regularly presents various recommendations to users on other members, or non-members that they may be interested in connecting with, and the member does not connect with those members, the system may adjust the weights of the factors that resulted in those members or non/members being recommended. In other examples, explicit feedback mechanisms (e.g., a button) may be provided to allow members to express their dissatisfaction with the recommendations.

In some examples, some signals may be relevant to certain uses. For example, location proximity, similar job titles or functions, similar employers, profile views, communications, similar skills, skill endorsements, common connections, membership in common groups, age similarity, browsemap score, out of network communications, recommendations, similar IP addresses, and inclusion in an address book may be more relevant to a connection invitation ordering. As another example, email address similarities, inclusion in an address book, and explicit feedback signals may be more relevant to recommending relevant non-members. Note though, that these are simply example signals. Other combinations of signals may be used for either use case.

Signal Gathering

The information needed to determine the presence of these signals may be gathered by the social networking service by logging the activity of members and non-members on the social networking service, from plug-ins or other applications on the member or non-member's computing device, from information gathered from other web or internet servers or services, or the like. For example, a member may choose to link or associate his or her email account such as a GMAIL® account (GMAIL® is run by Google, Inc., of Mountain View, Calif.), a POP account, an IMAP account, or the like with their social networking service account. In some examples, the social networking service may provide an integrated mail interface along with the user's member profile pages on the social networking service, thus providing a member's activities in one convenient location. The social networking service may then utilize information in the address book and information in the emails themselves (e.g., content, sender, recipient, subject, attachments, or the like) to determine the various signals. This information may also be used to generate the list of recommended non-members. Additionally, the information may be gathered from other websites, web services, or the like. For example, another social networking service may be mined for these signals.

While reference has been made to the general relevance engine embodiment, specific example non-limiting usages of the relevance engine will now be described. Additionally, in some other examples instead of a weighted aggregation of the subscores of the signals to calculate relevance, the relevance may be calculated using various statistical classification algorithms such as a Bayesian classifier (e.g., a naïve Bayes classifier). Training data may be input manually by administrators of the social networking service and then future uses of the relevance engine may be done automatically once the Bayesian classifier is trained properly. Feedback, either explicit or implicit may be used to fine tune the classifier. Other machine learning algorithms may also be employed, such as support vector machines.

Recommended Invitations to Non-Members

In some examples, the system may use various information gathered about a member to recommend individuals who are not yet members of the social networking service that the member knows to join the social networking service and/or to connect with the member. The system may use information from email accounts (e.g., address books, sent email, received email), blog posts, electronic calendar entries, associated websites (e.g., websites associated with the member through their member profiles, websites of employers or associated schools, and the like), other social networking services (e.g., FACEBOOK®, TWITTER®), and the like to gather potential non-member connections. This information may produce the corpus of potential connections. Information about the individuals in the corpus may be searched to determine whether or not they are already members of the social networking service. If they are members, the individuals may be presented as a recommended connection. The remaining members of the corpus who are determined not to be members may then be filtered and/or sorted based upon a determined relevance of each potential connection in the corpus to the member. This may be done using the method of FIG. 1. This relevance determination may use a variety of the previously discussed signals which may be weighted based upon perceived relevance. This relevance filtered and/or sorted list may contain names and/or email addresses of individuals who are candidates to be invited to the social networking service. This candidate list may then be presented to the member at operation 6050 and the member may select non-members to invite to the social networking service based upon this list.

Figure 2:
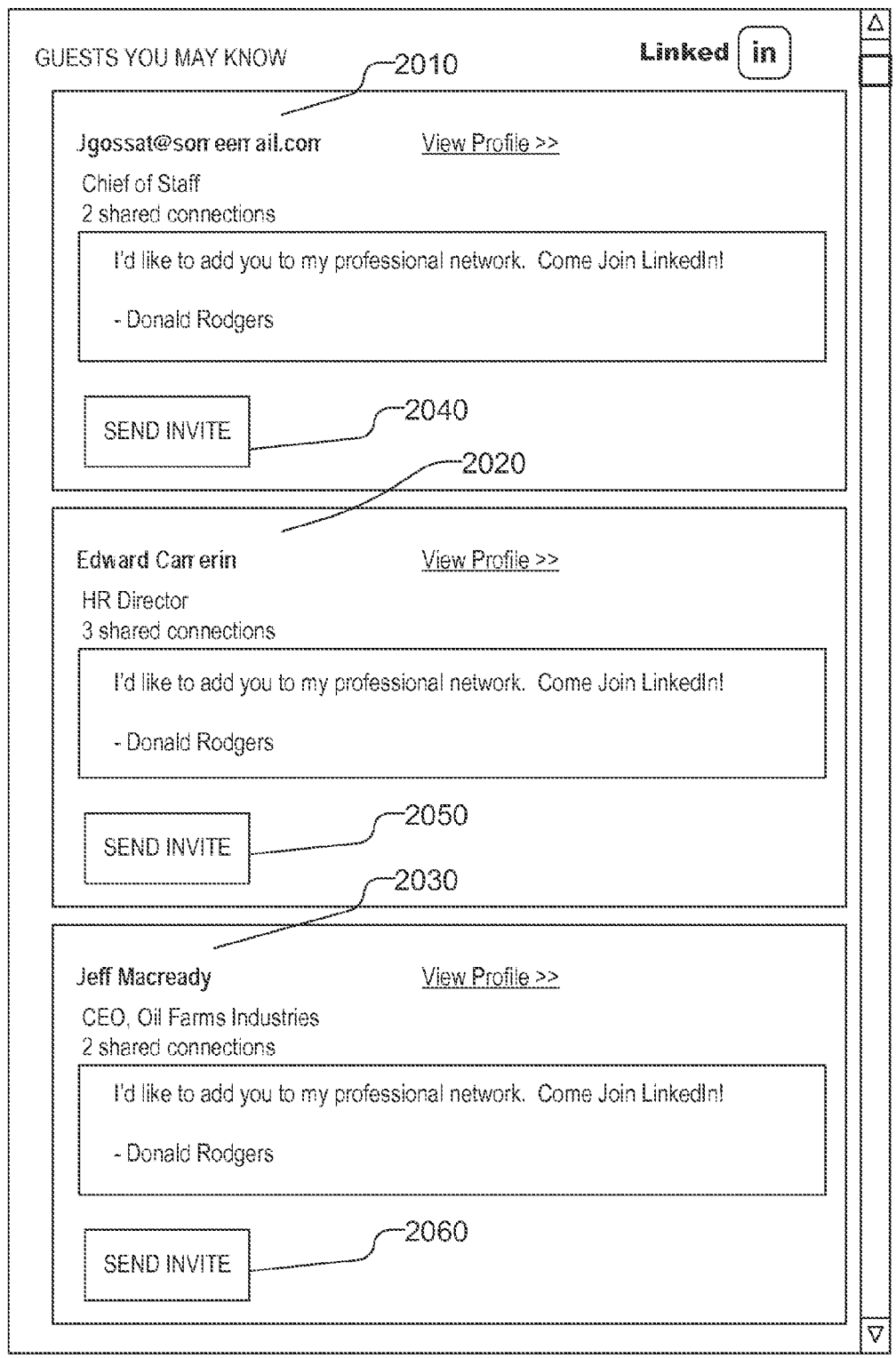
FIG. 2 shows an example graphical user interface of a list of recommended non-member connections sorted by relevance according to some examples of the present disclosure.

FIG. 2 shows one example of a screenshot of providing recommended non-member connection candidates. As the recommendation may flow from incomplete information gathered from disparate sources, the system may not have complete information about each recommended non-member. For example, in some cases the system may be able to determine a name for the individual 2020 and 2030, but in yet other cases this may not be possible as is shown at 2010, where an email address and a title is all that is known. The member may then have the opportunity to invite the non-member to join the social networking service by selecting buttons or links 2040-2060.

In some examples, if invited by the member, the non-member connection candidate may then receive an invitation to join the social networking service, and in some examples, also an invitation to immediately connect with the member who sent the invitation. The non-member may then proceed to create an account. In some examples, due to the possibly incomplete information known about the non-member connection candidate, the system may mistakenly identify a connection candidate as a non-member, when in fact, the connection candidate is a member. In this case, the individual may also be provided a link at the bottom of the invitation to correct this error by logging into to the social networking service. The social networking service may also then record the information about the invited individual (e.g., the individual's email address or other data that wasn't recognized by the social networking service as belonging to that member may be recorded in the member's profile).

Invitations Sorted by Relevance

In yet other examples, for users that may be inundated with invitations to connect, the system may collect these invitations, sort those invitations by relevance, and send out the invitations in a single notification (rather than multiple notifications). For example, based upon the signals collected about both the invited member and the inviting member, the system may determine a likelihood that the invited member and the inviting member know each other. Based on this likelihood and the likelihoods of other inviting members knowing the invited member, the invitations to the invited member may be ordered so as to show the highest likelihood first.

Figure 6:
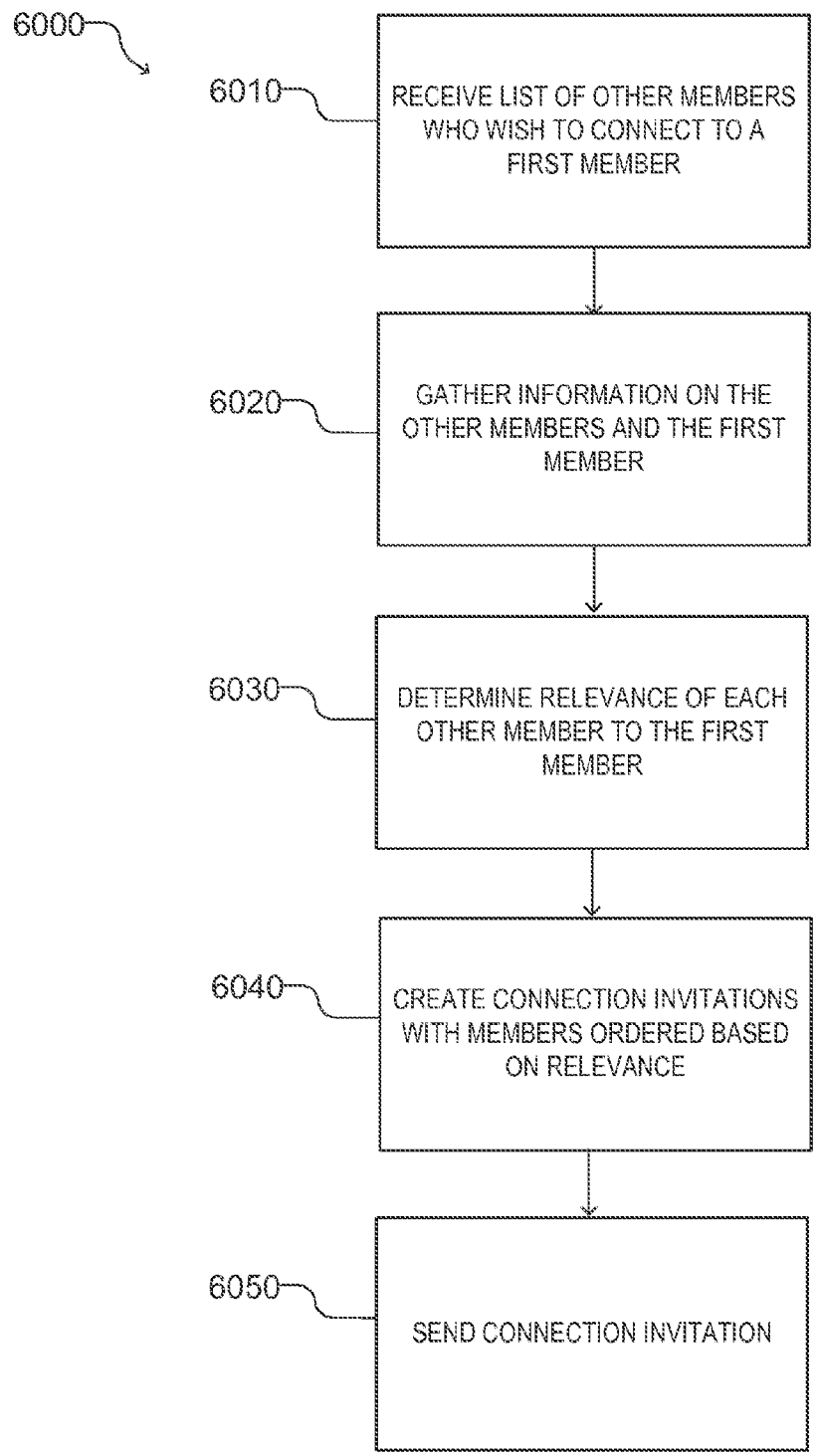
FIG. 6 shows a flowchart of a method of ordering a connection invitation based upon relevance according to some examples of the present disclosure.

FIG. 6 shows a flowchart of a method of ordering a connection invitation based upon relevance according to some examples of the present disclosure. At operation 6010 the list of other members who wish to connect to a subject matter are determined. In some examples, the social networking system may only send a connection invitation communication to a member periodically. Each connection invitation, as it is received by the social networking service, may be stored in a memory device (e.g., a hard drive). All the connection invitations received during a specific timeframe may be bundled into a periodic communication to prevent overloading the subject member.

At operation 6020, the social networking service may gather information used to compute relevance in the relevance engine on the members from operation 6010 and the subject member. The information that can be gathered and how it is gathered was previously explained. For example, the social networking service may obtain information from their profiles, access logs kept of the member's activities, or the like. Example signals may include one or more of: IP similarities, similar job functions, similar industries, information requests about the inviting member by the invitee member on the social networking service (e.g., profile views) and vice versa, communications between the individuals, similar skills, skill endorsements, common connections, membership in common groups, age similarities, browsemap scores, communications on other networking services, recommendations, similar locations, explicit feedback signals, and the like.

At operation 6030, the relevance to the subject member of each of the members wishing to connect with the subject member is determined. At operation 6040 the connection invitation communication may be created. The connection invitation communication may be sorted based upon the relevance scores calculated at operation 6030. In some examples, the communication may be an email message directing the subject member to a particular page on the social networking service that may allow the member to accept the invitations. In other examples, the member may accept or reject the invitation using one or more user interface controls in the communication itself. In other examples, the communication may be a notification, pop-up, text message, or other communication that may either immediately allow a member to accept or reject the invitation, or may link the member to a portion of the social networking service where the invitation may be rejected or accepted.

In some examples, a threshold relevance score may be used. Only those connection invitations from members whose relevance to the subject member is above the threshold relevance score may be included in the connection invitation communication. In some examples, those below the threshold may be immediately denied a connection. In other examples, those members whose relevance score is below the threshold may have their invitations moved to a less visible area of the communication, or not included on the communication at all and included on a page of the social networking service accessible to the subject member (and in some examples, a less visible page). For example, the email informing the subject member of the invitation requests may contain the most relevant invitations only and a link to view and decide on the invitations in the communication as well as the other pending invitations that were below the threshold level to be included on the communication. At operation 6050 the communication may be sent or delivered to the subject member.

Figure 3:
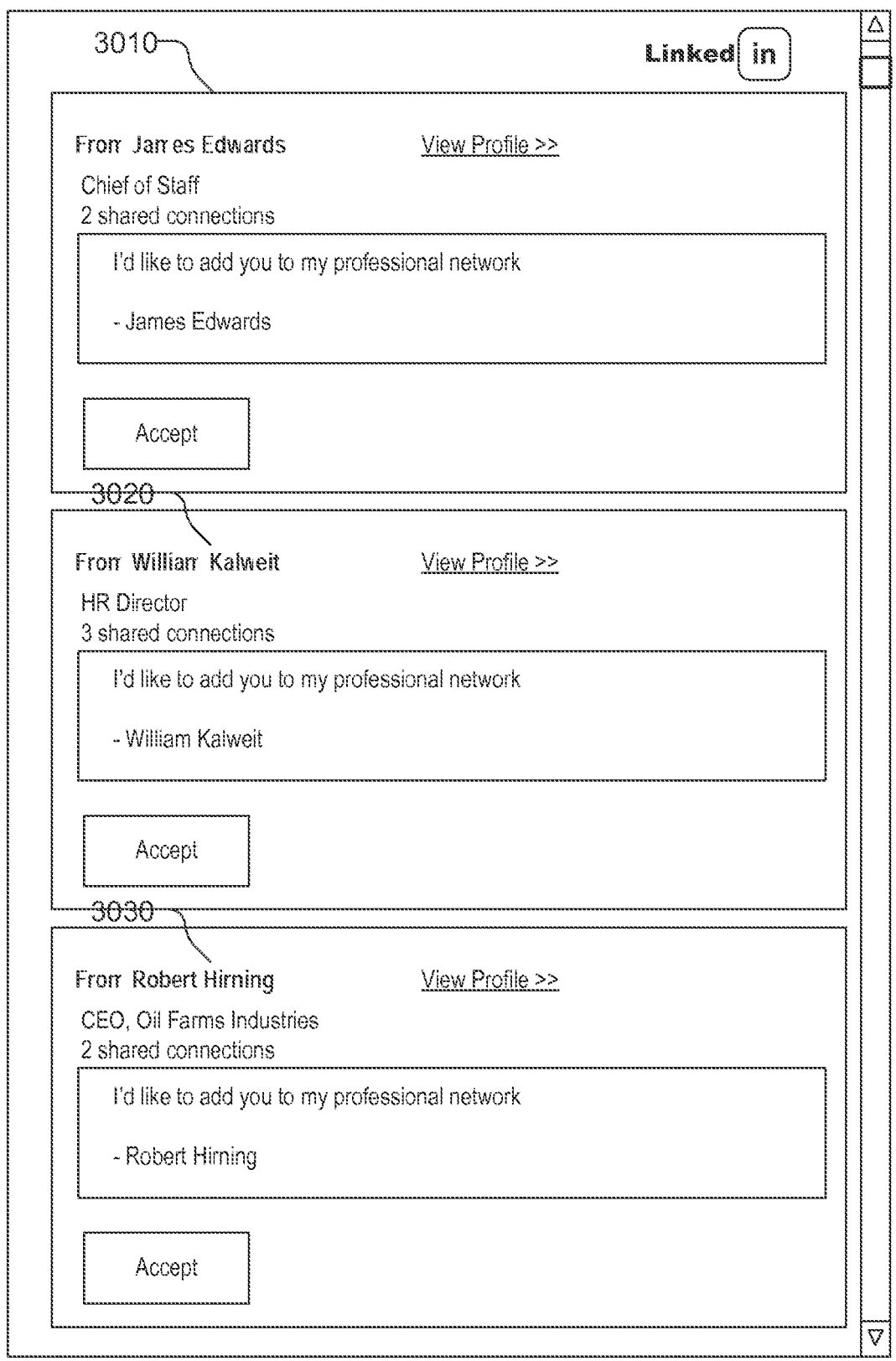
FIG. 3 shows an example graphical user interface of a list of connection invitations sorted by relevance according to some examples of the present disclosure.

FIG. 3 shows one example screenshot of an invitation email sent to an invited member showing invitations from James Edwards, William Kalweit and Robert Hirning 3010-3030. The invitation from James appears before the invitation from William or Robert as a result of the system's determination that James is more relevant to this member than William or Robert. In addition, other connection candidates (e.g., members who are trying to connect with this member) may have been left off due to filtering done based upon a relevance score. For example, the connection invitation may be filtered based on a threshold relevance score and then sorted based upon relevance.

Example Social Networking Service

Figure 4:
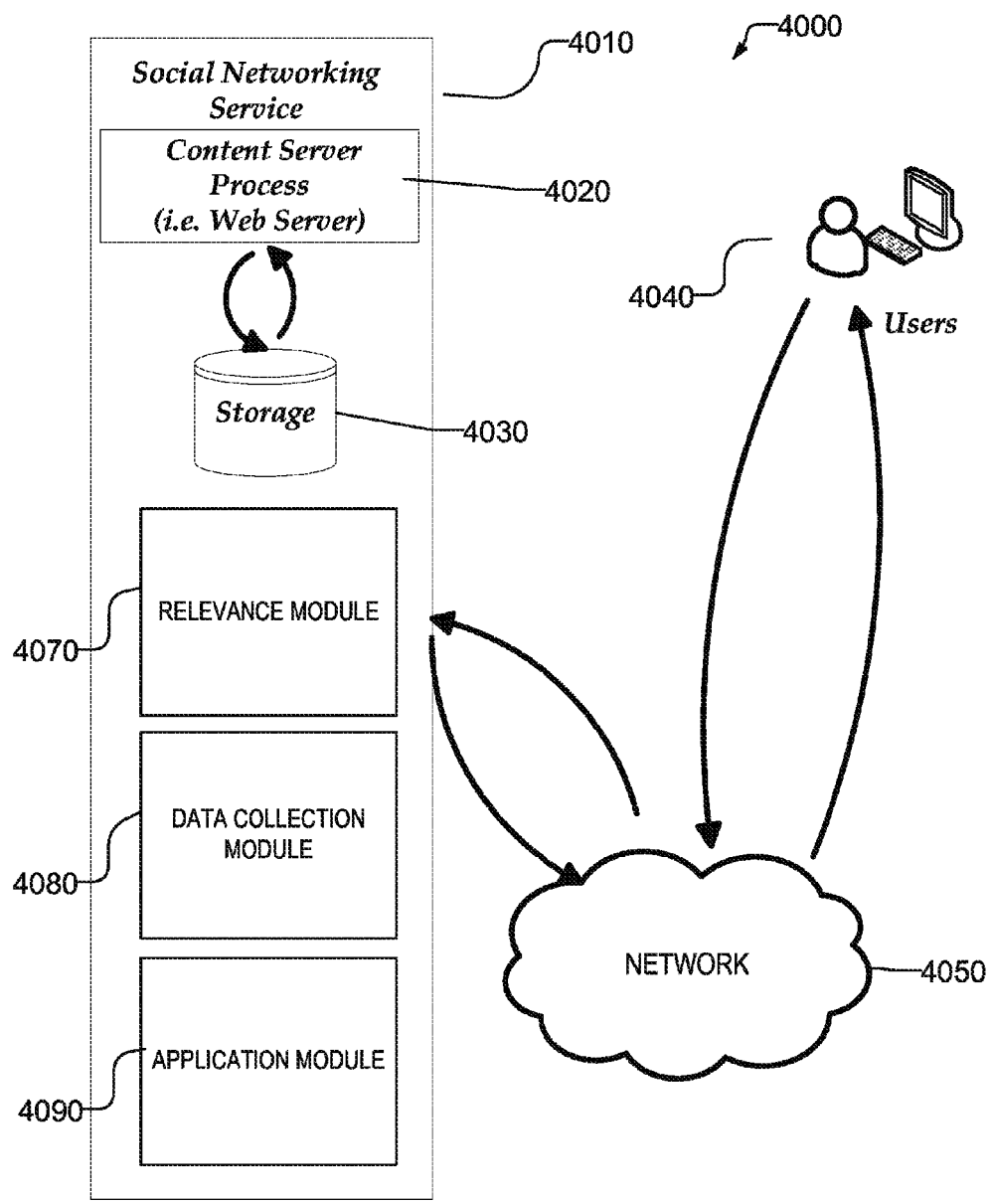
FIG. 4 shows an example schematic of a social networking service according to some examples of the present disclosure.

FIG. 4 shows an example system 4000 for providing a social networking service and for providing relevancy features. Social networking service 4010 may contain a content server process 4020. Content server process 4020 may communicate with storage 4030 and may communicate with one or more users 4040 through a network 4050. Content server process 4020 may be responsible for the retrieval, presentation, and maintenance of member profiles stored in storage 4030. Content server process 4020 in one example may include or be a web server that fetches or creates internet web pages. Web pages may be or include HyperText Markup Language (HTML), eXtensible Markup Language (XML), JavaScript, or the like. The web pages may include portions of, or all of, a member profile at the request of users 4040.

Users 4040 may include one or more members, prospective members, or other users of the social networking service 4010. Users 4040 access social networking service 4010 using a computer system through a network 4050. The network may be any means of enabling the social networking service 4010 to communicate data with users 4040. Example networks 4050 may be or include portions of one or more of: the Internet, a Local Area Network (LAN), a Wide Area Network (WAN), wireless network (such as a wireless network based upon an IEEE 802.11 family of standards), a Metropolitan Area Network (MAN), a cellular network, or the like.

Relevance module 4070 may compare a first individual (member or non member) to a second individual (member or non member) to determine a relevance score which may indicate how relevant the second individual is to the first individual. The relevance may be based upon one or more signals contained in storage 4030 that may have been collected by data collection module 4080.

In some examples the relevance score may be based upon a Bayesian classifier which was trained with previous social networking data. For example, the system may be trained manually by administrators of the social networking service. In other examples, the system may automatically train itself. For example, the system may use similarities between member profile data of members that are already connected to each other to determine which signals are most important. This is based upon the observation that members that are connected to each other are more likely to connect with other members like those whom they are already connected to rather than members that are different than those they are already connected to. Once the Bayesian classifier is trained, the classifier may then be used to classify new pairs of individuals (members or non-members). Other machine learning relevance algorithms may also be used, such as a support vector machine, or the like.

In other examples, the relevance score may determine relevance by aggregating a weighting of the subscores generated based upon the signals. The subscores may be generated based upon assigning one or more points for observed signals (according to one or more formulas). The relevance score may be the weighted sum of those scores.

As one example of a relevance classification, assume that the relevance classifier uses the following signals: an inferred distance (based on IP address) between the member and the connection candidate, profile views, co-views, and common group membership. The system may calculate a subscore for the inferred distance based upon subtracting the number of miles between the IP addresses associated with the member and the connection candidate from a predetermined value (say 150). For example, if the number of miles is 50, then the subscore would be 100. The system may calculate a subscore for profile views based on the number of times the member and/or the connection candidate viewed the other individual's profile. For example, each profile view may be worth 10 points. If the member viewed the connection candidate's profile twice, and the connection candidate viewed the member's profile once, then the subscore may be 30. Co-views may be calculated similarly, as can common group membership subscores. Each of these subscores may be multiplied by a respective weighting factor. Each weighting factor for each subscore may be the same weighting factor applied to a different subscore or a different weighting factor. Each of these weighted subscores may be summed to produce a measure of relevance which may describe the probability or likelihood that the individuals know each other or would find a connection relevant to their social network.

Data collection module 4080 may collect data about members and non-members. Data collection module 4080 may track member's actions on the social networking service by tracking profile visits, IP addresses, member profile information, member communications, and the like. Data collection module 4080 may also collect data from email accounts linked to the member's accounts. Data collection module 4080 may also collect data about non-members. Data collection module 4080 may also collect data from other networking services. This data may be collected through analysis of activities of members (e.g., emails to non-members, blog postings by members to blogs of non-members, or the like). In other examples, the data may be collected through various scraping activities.

Application module 4090 may provide one or more relevance based features to users 4040. For example, application module 4090 may recommend members to connect with other members, sort connection invitations and communicate them (e.g., email) to users 4040, and the like. Application module 4090 may also present recommendations to users 4040 of non-members that they may wish to connect to (which may be sorted based upon relevance). Application module 4090 may accomplish this in coordination with content server process 4020.

While in some examples described herein, the relevance was described as relating to social networking services and the relevance computed between a member and a candidate connection, the methods, systems, and machine readable mediums described herein would be equally applicable to comparisons between individuals in general based upon data gathered regarding the individuals from any computing system. One of ordinary skill in the art with the benefit of Applicants' disclosure would understand and appreciate that these examples fall within the scope of this disclosure.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
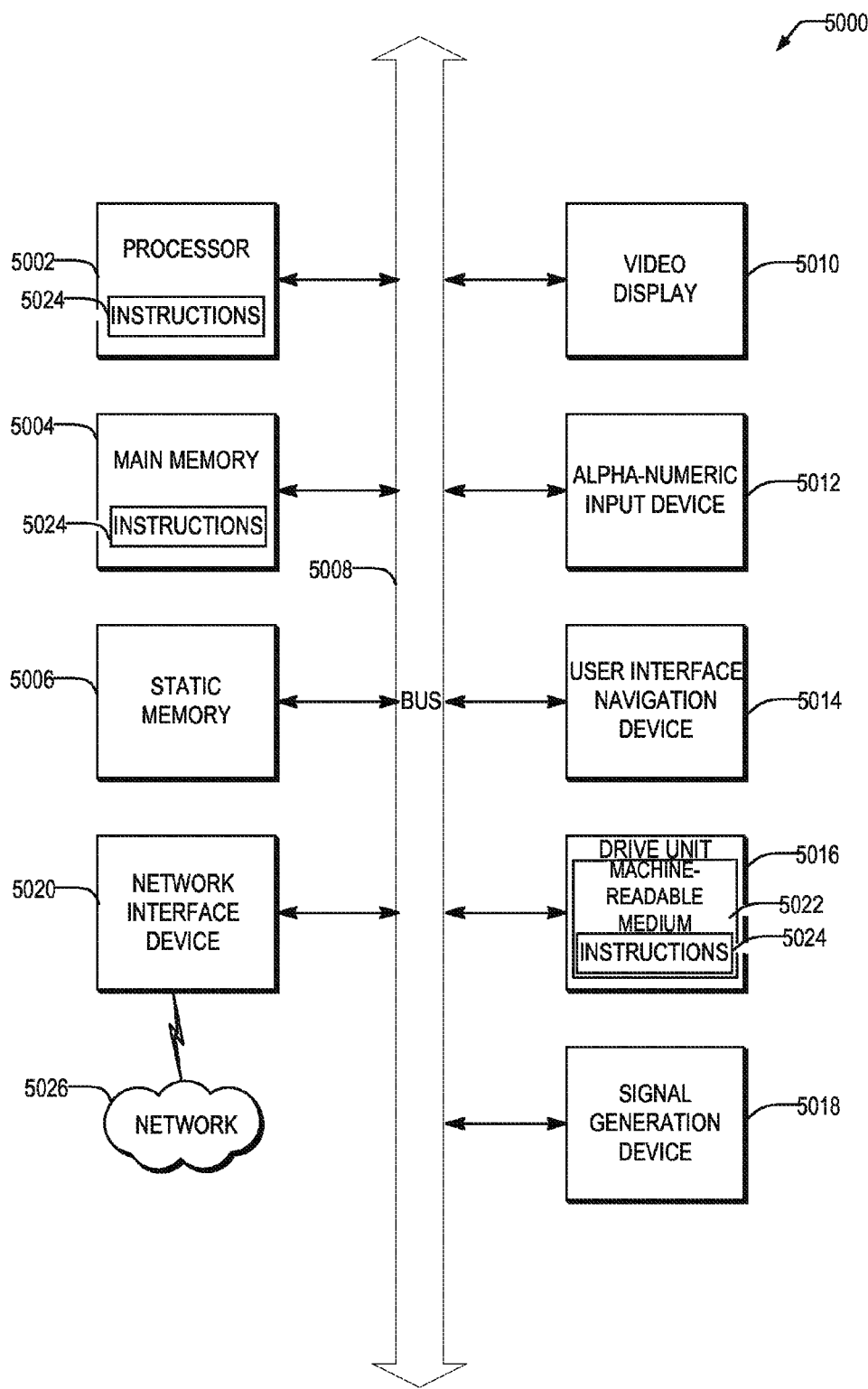
FIG. 5 shows an example schematic of a machine according to some examples of the present disclosure.

FIG. 5 is a block diagram of machine in the example form of a computer system 5000 within which instructions, for causing the machine to perform any one or more of the methodologies discussed herein, may be executed. For example, any one of the components shown in FIG. 4 may be or contain one or more of the components described in FIG. 5, and the methods of FIG. 1 may execute on any one of the components in FIGS. 4 and 5. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 5 or only a subset of the components shown in FIG. 5.

The example computer system 5000 includes a processor 5002 (e.g., a central processing unit (CPU), a graphics processing unit (GPU) or both), a main memory 5004 and a static memory 5006, which communicate with each other via a bus 5008. The computer system 5000 may further include a video display unit 5010 (e.g., a liquid crystal display (LCD) or a cathode ray tube (CRT)). The computer system 5000 also includes an alphanumeric input device 5012 (e.g., a keyboard, a touch display), a user interface (UI) navigation device 5014 (e.g., a mouse), a disk drive unit 5016, a signal generation device 5018 (e.g., a speaker) and a network interface device 5020.

Machine-Readable Medium

The disk drive unit 5016 includes a machine-readable medium 5022 on which is stored one or more sets of instructions and data structures (e.g., software) 5024 embodying or used by any one or more of the methodologies or functions described herein. The instructions 5024 may also reside, completely or at least partially, within the main memory 5004, static memory 5006, and/or within the processor 5002 during execution thereof by the computer system 5000, the main memory 5004 and the processor 5002 also constituting machine-readable media.

While the machine-readable medium 5022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 5024 may further be transmitted or received over a communications network 5026 using a transmission medium. The instructions 5024 may be transmitted using the network interface device 5020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 5020 may wirelessly transmit data and may include an antenna.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Other Notes and Examples

Example 1 includes subject matter (such as a method, means for performing acts, machine readable medium including instructions, when performed by a machine, cause the machine to perform acts, or an apparatus configured to perform) comprising on a social networking service: receiving a first connection invitation from a first member of the social networking service; receiving a second connection invitation from a second member of the social networking service, the first and second connection invitations expressing a desire by the first and second members, respectively, to connect to a subject member of the social networking service; determining a first relevance score for the first member, using one or more computer processors, based upon a first plurality of observed signals, the relevance score indicating a likelihood that the subject member knows the first member; determining a second relevance score for the second member, using the one or more computer processors, based upon a second plurality of observed signals, the second relevance score indicating a likelihood that the subject member knows the second member; and sending a notification to the subject member of the first and second connection invitations, the notification ordered based upon the first and second respective relevance scores of the first and second members.

In example 2, the subject matter of Example 1 may optionally include receiving a third connection invitation from a third member of the social networking service; determining a third relevance score for the third member, using the one or more computer processors, based upon a third plurality of observed signals, the third relevance score indicating a likelihood that the subject member knows the third member; comparing the third relevance score to a predetermined relevance threshold; determining that the third relevance score is less relevant than the predetermined relevance threshold; responsive to determining that the third relevance score is less relevant than the predetermined relevance threshold, not including the third connection invitation in the notification.

In example 3, the subject matter of any one of Examples 1-2 may optionally include wherein the first plurality of observed signals includes at least one of: any communication from the first member to the subject member; any communication from the subject member to the first member; a profile view of the first member by the subject member; common skills shared by the subject member and the first member; an age similarity between the subject member and the first member; employment histories of the subject member and the first member; and education histories of the subject member and the first member.

In example 4, the subject matter of any one of Examples 1-3 may optionally include wherein determining the first relevance score based upon a plurality of first signals comprises determining the first relevance score using the first plurality of signals as inputs to a Bayesian classifier.

In example 5, the subject matter of any one of Examples 1-4 may optionally include wherein determining the first relevance score based upon a plurality of first signals comprises at least determining a weighted score for each of the plurality of first observed signals and determining the first relevance score by at least summing the weighted scores for the plurality of observed signals.

In example 6, the subject matter of any one of Examples 1-5 may optionally include wherein determining the first relevance score based upon a plurality of first signals comprises determining a relevance score using at least a neural network.

In example 7, the subject matter of any one of Examples 1-6 may optionally include wherein the notification is an email.

Example 8 includes or may optionally be combined with the subject matter of any one of Examples 1-7 to include subject matter (such as a device, apparatus, system, or machine) comprising A system for providing recommended social networking connections, the system comprising: a data collection module configured to: receive a first connection invitation from a first member of the social networking service; receive a second connection invitation from a second member of the social networking service, the first and second connection invitations expressing a desire by the first and second members, respectively, to connect to a subject member of the social networking service; a relevance module configured to: determine a first relevance score for the first member, using one or more computer processors, based upon a first plurality of observed signals, the first relevance score indicating a likelihood that the subject member knows the first member; determine a second relevance score for the second member, using the one or more computer processors, based upon a second plurality of observed signals, the second relevance score indicating a likelihood that the subject member knows the second member; and an application module configured to: send a notification to the subject member of the first and second connection invitations, the notification ordered based upon the first and second respective relevance scores of the first and second members.

In example 9, the subject matter of any one of Examples 1-8 may optionally include wherein the data collection module is configured to: receive a third connection invitation from a third member of the social networking service; wherein the relevance module is configured to: determine a third relevance score for the third member, using the one or more computer processors, based upon a third plurality of observed signals, the relevance score indicating a likelihood that the subject member knows the third member; compare the third relevance score to a predetermined relevance threshold; determine that the third relevance score is less relevant than the predetermined relevance threshold; and responsive to determining that the third relevance score is less relevant than the predetermined relevance threshold, the application module configured to not include the third connection invitation in the notification.

In example 10, the subject matter of any one of Examples 1-9 may optionally include wherein the first plurality of observed signals includes at least one of: any communication from the first member to the subject member; any communication from the subject member to the first member; a profile view of the first member by the subject member; common skills shared by the subject member and the first member; an age similarity between the subject member and the first member; employment histories of the subject member and the first member; and education histories of the subject member and the first member.

In example 11, the subject matter of any one of Examples 1-10 may optionally include wherein the relevance module is configured to determine the first relevance score based upon a plurality of first signals at least by determining the first relevance score using the first plurality of signals as inputs to a Bayesian classifier.

In example 12, the subject matter of any one of Examples 1-11 may optionally include wherein the relevance module is configured to determine the first relevance score based upon a plurality of first signals at least by determining a weighted score for each of the plurality of first observed signals and determining the first relevance score by at least summing the weighted scores for the plurality of observed signals.

In example 13, the subject matter of any one of Examples 1-12 may optionally include wherein the relevance module is configured to determine the first relevance score based upon a plurality of first signals at least by determining a relevance score using at least a neural network.

In example 14, the subject matter of any one of Examples 1-13 may optionally include wherein the notification is an email.

What is claimed is:

1. A method comprising:
on a computer-based social networking service, executing computer program instructions which cause one or more computer processors to perform the operations of:
receiving a plurality of connection invitation requests from a plurality of members, the plurality of connection invitation requests directed to a subject member of the social networking service;
determining a plurality of relevance scores for the plurality of members based upon a plurality of signals, wherein the plurality of relevance scores indicate a relevance of respective members of the plurality of members to the subject member;
aggregating, without sending to the subject member, the plurality of connection invitation requests received from the plurality of members by storing the plurality of connection invitation requests in a database until a predetermined timeframe has elapsed; and
generating, in response to the predetermined timeframe elapsing, a notification to the subject member, the notification including a connection invitation corresponding to a connection invitation request of the plurality of connection invitation requests, the connection invitation selected based on the plurality of relevance scores.

2. The method of claim 1, wherein a relevance score of the plurality of relevance scores indicates a predicted likelihood that the subject member knows a member of the plurality of members, the member corresponding to the relevance score.

3. The method of claim 2, wherein a second connection invitation request of the plurality of connection invitation requests is not included in the notification based on a second relevance score corresponding to the second connection invitation request, wherein the second relevance score is below a threshold.

4. The method of claim 1, wherein the notification includes a plurality of connection invitations ordered according to the plurality of relevance scores.

5. The method of claim 1, wherein the plurality of signals includes at least one of:
a communication from a first member of the plurality of members to the subject member;
a communication from the subject member to the first member;
a profile view of the first member by the subject member;
common skills shared by the subject member and the first member;
an age similarity between the subject member and the first member;
employment histories of the subject member and the first member; and
education histories of the subject member and the first member.

6. The method of claim 1, wherein determining the plurality of relevance scores based upon the plurality of signals comprises determining the plurality of relevance scores using the plurality of signals as inputs to a Bayesian classifier.

7. The method of claim 1, wherein determining the plurality of relevance scores based upon the plurality of signals comprises at least determining a weighted score for each of the plurality of signals and determining the plurality of relevance scores by at least summing the weighted scores for the plurality of signals.

8. The method of claim 1, wherein determining the plurality of relevance scores based upon the plurality of signals comprises determining the plurality of relevance scores using at least a neural network.

9. A system for providing recommended social networking connections, the system comprising:
a non-transitory machine readable medium stored thereon including instructions, which, when executed by a processor, cause the system to:
receive a plurality of connection invitation requests from a plurality of members, the plurality of connection invitation requests directed to a subject member of a social networking service;
determine a plurality of relevance scores for the plurality of members based upon a plurality of signals, wherein the plurality of relevance scores indicate a relevance of respective members of the plurality of members to the subject member;
aggregate, without sending to the subject member the plurality of connection invitation requests received from the plurality of members by storing the plurality of connection invitation requests in a database until a predetermined timeframe has elapsed; and
generate, in response to the predetermined timeframe elapsing, a notification to the subject member, the notification including a connection invitation corresponding to a connection invitation request of the plurality of connection invitation requests, the connection invitation selected based on the plurality of relevance scores.

10. The system of claim 9, wherein a relevance score of the plurality of relevance scores indicates a predicted likelihood that the subject member knows a member of the plurality of members, the member corresponding to the relevance score.

11. The system of claim 10, wherein a second connection invitation request of the plurality of connection invitation requests is not included in the notification based on a second relevance score corresponding to the second connection invitation request, wherein the second relevance score is below a threshold.

12. The system of claim 9, wherein the notification includes a plurality of connection invitations ordered according to the plurality of relevance scores.

13. A non-transitory machine readable medium that is not a transitory propagating signal, that stores instructions which when performed by a machine, cause the machine to perform operations comprising:
receiving a plurality of connection invitation requests from a plurality of members, the plurality of connection invitation requests directed to a subject member of a social networking service;
determining a plurality of relevance scores for the plurality of members based upon a plurality of signals, wherein the plurality of relevance scores indicate a relevance of respective members of the plurality of members to the subject member;
aggregating, without sending to the subject member, the plurality of connection invitation requests received from the plurality of members by storing the plurality of connection invitation requests in a database until a predetermined timeframe has elapsed; and
generating, in response to the predetermined timeframe elapsing, a notification to the subject member, the notification including a connection invitation corresponding to a connection invitation request of the plurality of connection invitation requests, the connection invitation selected based on the plurality of relevance scores.

14. The machine readable medium of claim 13, wherein a relevance score of the plurality of relevance scores indicates a predicted likelihood that the subject member knows a member of the plurality of members, the member corresponding to the relevance score.

15. The machine readable medium of claim 14, wherein a second connection invitation request of the plurality of connection invitation requests is not included in the notification based on a second relevance score corresponding to the second connection invitation request, wherein the second relevance score is below a threshold.

16. The machine readable medium of claim 13, wherein the notification includes a plurality of connection invitations ordered according to the plurality of relevance scores.

17. The machine readable medium of claim 13, wherein the plurality of signals includes at least one of:
 a communication from a first member of the plurality of members to the subject member;
 a communication from the subject member to the first member;
 a profile view of the first member by the subject member;
 common skills shared by the subject member and the first member;
 an age similarity between the subject member and the first member;
 employment histories of the subject member and the first member; and
 education histories of the subject member and the first member.

18. The machine readable medium of claim 13, wherein determining the plurality of relevance scores based upon the plurality of signals comprises determining the plurality of relevance scores using the plurality of signals as inputs to a Bayesian classifier.

19. The machine readable medium of claim 13, wherein determining the plurality of relevance scores based upon the plurality of signals comprises at least determining a weighted score for each of the plurality of signals and determining the plurality of relevance scores by at least summing the weighted scores for the plurality of signals.

20. The machine readable medium of claim 13, wherein determining the plurality of relevance scores based upon the plurality of signals comprises determining the plurality of relevance scores using at least a neural network.

* * * * *